(12) United States Patent
Adhikari et al.

(10) Patent No.: US 8,553,637 B2
(45) Date of Patent: Oct. 8, 2013

(54) DOWNLINK PDSCH TRANSMISSION MODE SELECTION AND SWITCHING ALGORITHM FOR LTE

(75) Inventors: Shubhodeep Adhikari, Bangalore (IN); Daniel R. Tayloe, Phoenix, AZ (US)

(73) Assignee: Motorola Mobility LLC, Libertyville, IL (US)

( * ) Notice: Subject to any disclaimer, the term of this patent is extended or adjusted under 35 U.S.C. 154(b) by 80 days.

(21) Appl. No.: 13/214,546

(22) Filed: Aug. 22, 2011

(65) Prior Publication Data
US 2012/0057538 A1    Mar. 8, 2012

(51) Int. Cl.
H04W 4/00    (2009.01)

(52) U.S. Cl.
USPC ......................................................... 370/329

(58) Field of Classification Search
USPC ................. 370/203, 208, 252, 241, 312, 329, 370/328, 330, 310, 334, 338, 335, 349, 468; 375/267, 219, 227, 259; 455/507, 509
See application file for complete search history.

(56) References Cited

U.S. PATENT DOCUMENTS

| | | | | |
|---|---|---|---|---|
| 2005/0007948 A1* | 1/2005 | Wan et al. | ...................... | 370/208 |
| 2007/0223422 A1* | 9/2007 | Kim et al. | ...................... | 370/334 |
| 2011/0103335 A1* | 5/2011 | Golitschek Edler Von Elbwart et al. | .............................. | 370/329 |
| 2011/0110312 A1* | 5/2011 | Zhao et al. | ..................... | 370/329 |
| 2011/0149765 A1* | 6/2011 | Gorokhov et al. | ............. | 370/252 |
| 2012/0039199 A1* | 2/2012 | Chen et al. | ..................... | 370/252 |
| 2012/0044921 A1* | 2/2012 | Chung et al. | .................. | 370/338 |
| 2012/0076028 A1* | 3/2012 | Ko et al. | ........................ | 370/252 |
| 2012/0113951 A1* | 5/2012 | Koo et al. | ..................... | 370/329 |
| 2012/0188976 A1* | 7/2012 | Kim et al. | ..................... | 370/329 |
| 2013/0028344 A1* | 1/2013 | Chen et al. | ..................... | 375/267 |
| 2013/0028345 A1* | 1/2013 | Ko et al. | ........................ | 375/267 |
| 2013/0058307 A1* | 3/2013 | Kim et al. | ..................... | 370/329 |

* cited by examiner

Primary Examiner — Abdullah Riyami (57) ABSTRACT

A method, system, and base station for deterministically selecting a downlink transmission mode and rank in a Long Term Evolution (LTE) configured wireless communication system. The Transmission Mode Selection (TMS) utility receives from a wireless device a request for downlink physical downlink shared channel (PDSCH) service using a particular transmission mode and specific rank. The TMS utility determines an estimate of the throughput corresponding to the request. In addition, the TMS utility obtains throughput estimates of other distinct pairings of transmission mode and rank to compare with the throughput estimate corresponding to the request. The TMS utility utilizes device feedback information and HARQ error information that are already existing/available in order to determine the best transmission mode and rank pair, according to the best Error-Adjusted-Throughput.

20 Claims, 5 Drawing Sheets

DOWNLINK PDSCH TRANSMISSION MODE SELECTION AND SWITCHING ALGORITHM FOR LTE

BACKGROUND

1. Technical Field

The present invention generally relates to wireless communication systems and in particular to transmission mode selection in wireless communication systems.

2. Description of the Related Art

Multiple-Input Multiple-Output (MIMO) systems are a primary enabler of the high data rate sought to be achieved by Long Term Evolution (LTE), an emerging 4G wireless access technology. Closed-Loop-Spatial-Multiplexing and Open-Loop-Spatial-Multiplexing are the two primary MIMO Transmission Modes used in the LTE downlink. In order to achieve satisfactory throughput performance, the choice of the most suitable MIMO Transmission Mode should not only depend on the measured signal quality at the mobile but also on additional factors such as the channel correlation and mobile speed.

In wireless communication systems, a base station selects a particular transmission mode and rank based on several factors, including the precoder and the Channel Quality Indicator (CQI) information reported by the mobile. Some of the other factors which are not reported by the mobile device and upon which the transmission mode and rank selection depends include (a) the relative speed between the mobile and the base station (Doppler) and (b) the channel correlation (multipath) between the base station and mobile antennas. Conventional approaches utilize complicated algorithms for heuristic estimation of Doppler and Multi-path to adjust the downlink transmission modes. Two particular approaches for solving the transmission mode and rank selection problem are the following: (a) at the mobile: CQI/PMI/RI (precoder matrix index/rank indicator) reporting is modified to be based not only on the measured Carrier to Interference (C/I) (ratio) but also on the observed channel correlation and Doppler; and (b) at the eNodeB: the correlation and Doppler are estimated at the eNodeB and the estimated information is used together with the reported CQI/PMI/RI to select a suitable transmission mode and rank. However, these solutions have the following problems: (1) the LTE standards do not impose any requirement on the mobile device to estimate the channel correlation and Doppler, so the mobile device based solution described in (a) above is not workable; (2) Estimation of correlation and speed require (a) fine measurements of the channel between the mobile and the eNodeB and (b) a significant level of computational and logical complexity; and (3) The most significant obstacle is the fact that there is no deterministic way to map the correlation and speed to the performance of specific transmission modes and rank. Additionally, the performance of transmission modes and rank also depends on the C/I operating point. Consequently, any such heuristic map would be very sensitive to at least three (3) input parameters, Doppler, channel correlation (multipath) and measured C/I. There can be other additional mobile device and eNodeB specific conditions that could influence the performance of the downlink Transmission Modes and Rank. Consequently, a scheme at the eNodeB (or the mobile device) to determine all the major causes affecting performance of Transmission Modes and selecting the most suitable Transmission Mode (TxMode) and Rank based on the estimated value for each of the major causes, would be complex and a heuristic guess at best.

Through empirical data, simulations and analysis, it has been observed that if an eNodeB automatically follows/fulfills the request by a mobile/wireless device and provides downlink communication transmission to the wireless device via the requested transmission mode and rank, then the achieved throughput would be suboptimal. There can even be regions of throughput inversion, in which regions the measured throughput reduces with an increase in C/I. Thus, suboptimal throughput is likely achieved if the eNodeB blindly follows wireless devices' inputs/indications for the best Transmission Mode and Rank pairing.

BRIEF DESCRIPTION OF THE DRAWINGS

The embodiments described herein and advantages thereof, will best be understood by reference to the following detailed description of illustrative embodiments when read in conjunction with the accompanying drawings, wherein.

DETAILED DESCRIPTION OF AN ILLUSTRATIVE EMBODIMENT

The illustrative embodiments provide a method, system, and base station for deterministically selecting a downlink transmission mode in a Long Term Evolution (LTE) configured wireless communication system. The Transmission Mode Selection (TMS) utility receives from a wireless device a request for downlink physical shared channel (PDSCH) service using a particular transmission mode and specific rank. The TMS utility determines an estimate of the throughput corresponding to the request. In addition, the TMS utility obtains estimates of Hybrid Automatic Repeat Request (HARQ) error adjusted throughput corresponding to other distinct pairings of transmission mode and rank to compare with the throughput estimate corresponding to the request. The TMS utility utilizes device feedback information and HARQ error information that are already existing/available in order to determine the best transmission mode and rank pair, according to the best Error-Adjusted-Throughput.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
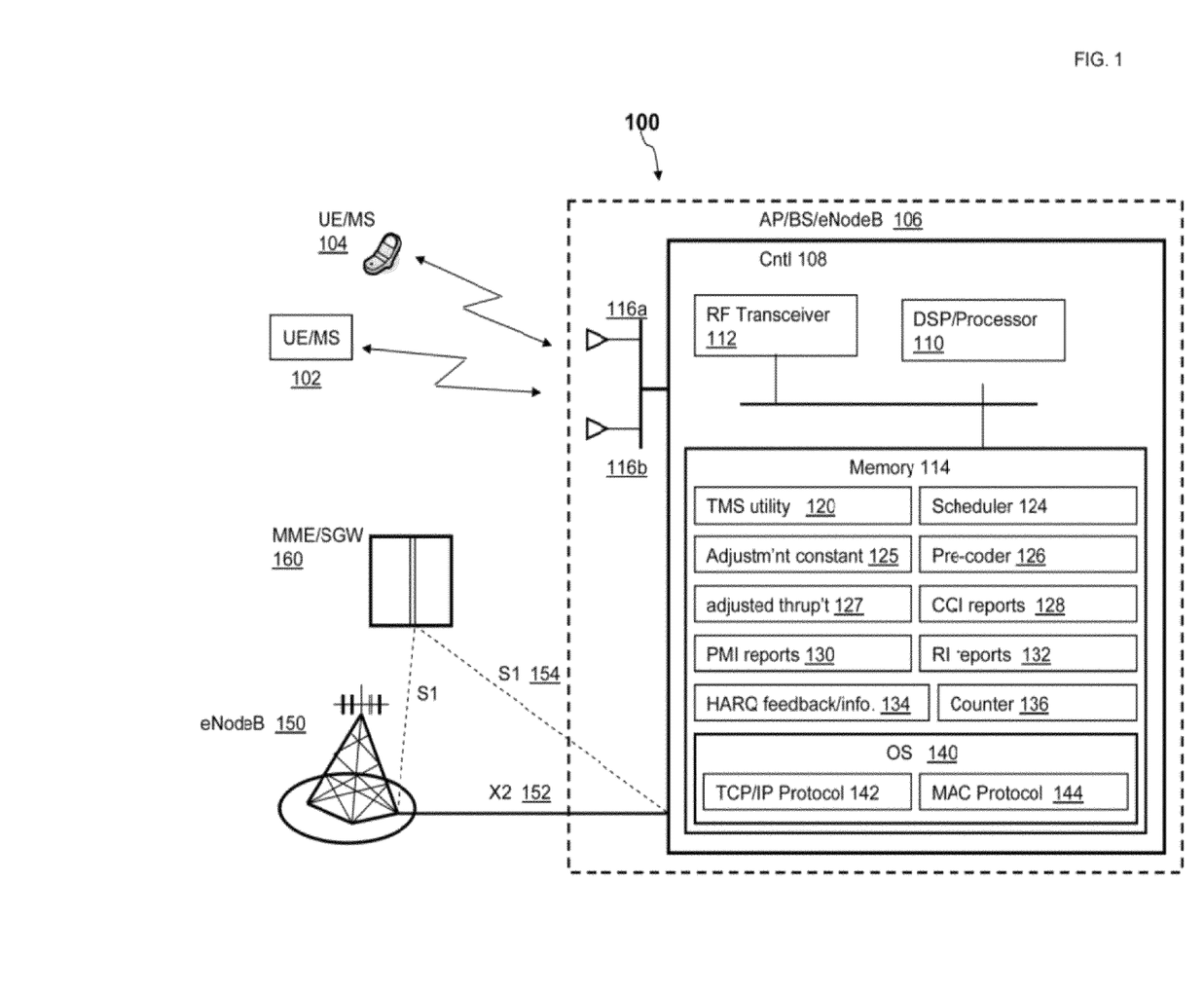
FIG. 1 illustrates a Long Term Evolution (LTE) configured wireless communication system including a block diagram representation of a base-station (BS)/eNodeB, according to one embodiment.

With reference now to FIG. 1, a Long Term Evolution (LTE) configured wireless communication system is illustrated, according to one embodiment. In the described embodiments, wireless communication system 100 may support several standards/networks, such as third generation (3G) and fourth generation (4G) networks, which include Long Term Evolution (LTE) standard.

Wireless communication system 100 comprises a number ("L") of wireless communication devices, for example, first and second wireless devices, mobile station (MS)/user equipment (UE) 102 and MS/UE 104. One or more of the wireless communication devices may be associated with a mobile user/subscriber. Thus, in certain instances, a wireless communication device may be interchangeably referred to herein as a user device, user equipment (UE), mobile user device, mobile station (MS), subscriber or user, as a general reference to the association of the device(s) to a device user. These references are however not intended to be limiting on the applicability of the invention to devices not directly associated with individual/human users. Within the description which follows, the example wireless device is primarily referred to as MS/UE 102 or simply UE 102.

Wireless communication system 100 comprises at least one base-station (BS)/Evolved Universal Terrestrial Radio Access Network Node B (eNodeB/eNB) 106, illustrated with its various functional components in block diagram representation. In one embodiment, BS/eNodeB 106 may represent a base transceiver station (BTS), an enhanced/evolved node B (enodeB), or a base station. BS/enodeB 106 comprises controller (Cntl) 108. Controller 108 comprises memory 114, digital signal processor (DSP)/Processor 110 and RF transceiver 112. Although the logic of RF transceiver 112 is illustrated within controller 108, it should be appreciated that with other implementations, RF transceiver 112 may likely be positioned external to controller 108. Also, while shown as a single module/device, DSP/Processor 110 may be one or more individual components communicatively coupled to each other, and controlling different functions within Cntl 108. The wireless communication devices all connect to BS/eNodeB 106 via an antenna array comprising one or more antenna elements, of which BS antenna 116 is illustrated.

Wireless communication system 100 is further illustrated with second BS/eNodeB 150. BS/eNodeB 106 and second BS/eNodeB 150 are interconnected by means of an X2 interface (e.g., X2 152). Furthermore, BS/eNodeB 106 and second BS/eNodeB 150 are connected by means of an S1 interface (e.g., S1 154) to an evolved packet core (EPC), more specifically, to mobility management entity (MME)/serving gateway (S-GW) 160.

In addition to the above described hardware components of BS/eNodeB 106 within wireless communication system 100, various features of the invention may be completed/supported via software (or firmware) code or logic stored within memory 114 (or other storage) and executed by DSP/Processor 110. Thus, for example, illustrated within memory 114 are a number of software/firmware/logic components/modules, including operating system (OS) 140 which includes Transmission Control Protocol (TCP)/Internet Protocol (IP) module 142 and Media Access Control (MAC) protocol module 144. Memory 114 also includes scheduler 124, precoder 126, CQI reports/values 128, error adjusted throughput values 127 and HARQ feedback information/histories 134. BS/eNodeB 106 schedules via scheduler 124 downlink communication of data between BS 106 and wireless device 102. Also included within memory 114 are counter 136, configurable adjustment constant 125, rank indicator (RI) reports 132 and precoding matrix indicator (PMI) reports 130. In addition, memory 114 comprises transmission mode selection (TMS) logic/utility 120. In actual implementation, TMS logic 120 may be combined with scheduler 124 as well as with one or more of the other components/modules to provide a single executable component, collectively providing the various functions of each individual component when the corresponding combined utility is executed by processing components of BS/eNodeB 106. In the descriptions which follow, TMS utility 120 is illustrated and described as a stand-alone or separate software/firmware component, which provides specific functions, as described below. In the described embodiment, TMS utility 120 provides certain functions that are executed by components within communication architecture/system 100, specifically MS/UE 102 and/or BS/eNodeB 106. Additional detail of the functionality associated with TMS logic/utility 120 is presented below with reference to FIG. 2 and subsequent figures.

During wireless communication, MS/UE 102 and MS/UE 104 wirelessly communicates with BS/eNodeB 106 via the antenna array. As one wireless device, e.g., MS/UE 102, receives data from another electronic device (e.g., MS/UE 104), BS/eNodeB 106 schedules, via scheduler 124, downlink communication of data between BS/ENodeB 106 and MS/UE 102. Furthermore, scheduler 124 schedules both the uplink and downlink TCP data transmission pertaining to wireless devices, MS/UE 102 and MS/UE 104.

Figure 2:
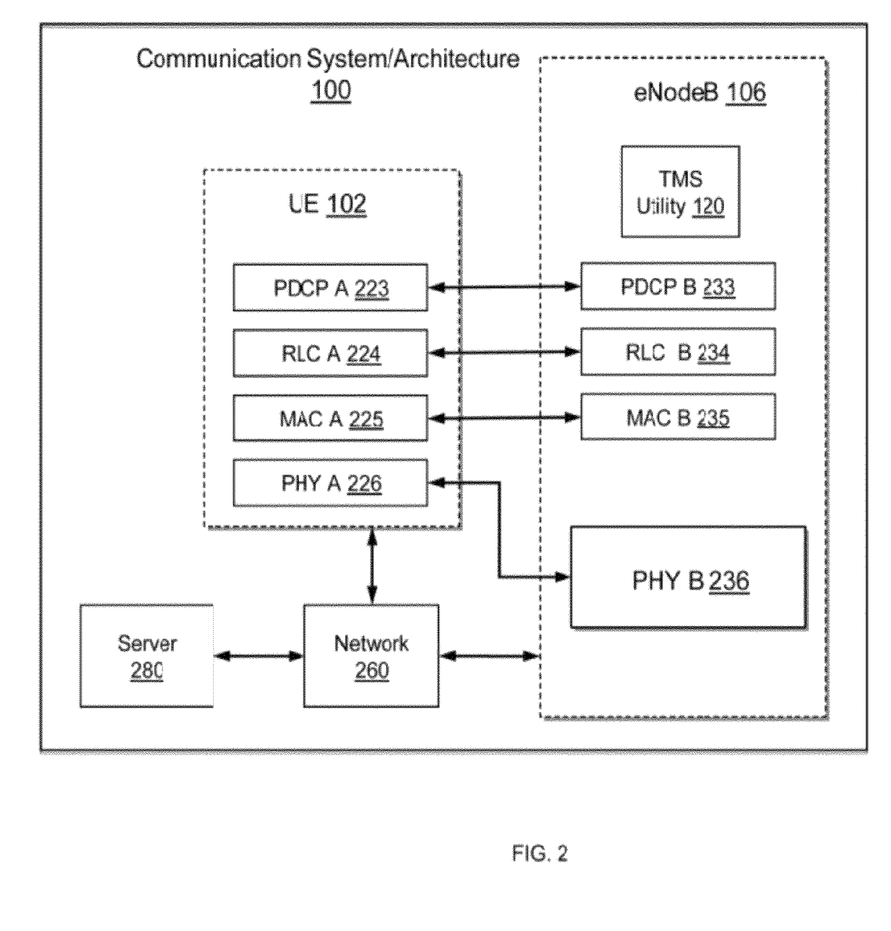
FIG. 2 provides a block diagram representation of a communication architecture for communication between user equipment (UE) and Evolved Universal Terrestrial Radio Access Network Node B (eNodeB), according to one embodiment.

With reference now to FIG. 2, there is depicted a block diagram representation of a communication architecture for communication between user equipment (UE) and Evolved Universal Terrestrial Radio Access Network Node B (eNodeB). As illustrated, communication architecture 100 comprises UE 102 and eNodeB 106. UE 102 comprises packet data convergence protocol (PDCP) A 223, radio link control (RLC) A 224, medium access control (MAC) A 225, and physical layer (PHY) A 226. In communication with UE 102 is eNodeB 106. Included within eNodeB 106 are: transmission mode selection (TMS) logic/utility 120, packet data convergence protocol (PDCP) B 233, radio link control (RLC) B 234, medium access control (MAC) B 235, and physical layer (PHY) B 236. Additionally, communication system/architecture 100 includes network 260 and server 280.

In one embodiment, eNodeB 106 transmits and receives data and/or information from UE 102. PDCP A 223, RLC A 224, MAC A 225, and PHY A 226 of UE 102 enable UE 102 to communicate (e.g., configuration data) via respective connections/layers with eNodeB 106, which similarly comprises PDCP B 233, RLC B 234, MAC B 235, and PHY B 236. Network 260 also receives and transmits data to and from UE 102 and eNodeB 106. Network 260 may send and receive data/information from one or more components (not shown) via server 280. Server 280 represents a software deploying server and communicates with eNodeB 106 via network 260. TMS utility 120 may be deployed from/on the network, via server 280. With this configuration, the software deploying server performs one or more functions associated with the execution of TMS utility 120.

Those of ordinary skill in the art will appreciate that the hardware components and basic configuration depicted in FIG. 1 and FIG. 2 may vary. The illustrative components within wireless communication system/architecture 100 and BS/eNodeB 106 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Certain of the functions supported and/or provided by TMS utility/logic 120 are implemented via processing logic (or code) executed by processor 110 and/or other device hardware. Among the software code/instructions/logic provided by TMS utility 120, and which are specific to the described embodiment, are: (a) logic for receiving from a wireless device indications of a best particular transmission mode and rank for downlink transmission service, based on one or more reports including channel quality indicator (CQI) reports, PMI reports and RI reports; (b) logic for using the HARQ error history at the enodeB to calculate a first error-adjusted-throughput corresponding to the transmission mode and rank (e.g. rank 2) indicated by the wireless device; (c) logic for providing estimates of HARQ error adjusted throughput corresponding to other distinct pairings of transmission mode and rank; and (d) logic for selecting the transmission mode and rank with the best error adjusted throughput based on a comparison between the first error-adjusted-throughput and the error-adjusted-throughput corresponding to other distinct pairings of transmission mode and rank. According to the illustrative embodiment, when processor 110 executes TMS utility 120, eNodeB 106 initiates a series of functional processes that enable the above functional features as well as additional features/functionality. These features/functionalities are described in further detail below within the (continuing description of FIGS. 1-2 and) description of FIGS. 3-5.

In LTE, the downlink transmission modes that provide the highest data rates are (a) Closed Loop Spatial Multiplexing (CLSM) (i.e., Mode 4) that is also referred to as Closed Loop Multiple Input Multiple Output (CL-MIMO) and (b) Open Loop Spatial Multiplexing (OLSM) (i.e., Mode 3) that is also referred to as Open Loop MIMO. Both transmission modes consist of sending either one or two concurrent data streams from eNodeB/BS 106 to the mobile/MS 102.

Multiple Input Multiple Output (MIMO) transmission modes form an essential part of LTE by enabling the LTE configured system, for example, wireless communication system 100 to achieve ambitious requirements for throughput and spectral efficiency. MIMO refers to the use of multiple antennas at the transmitter and receiver side. For the LTE downlink, a 2×2 configuration for MIMO is assumed as the initial baseline configuration, i.e. two transmit antennas at the base station and two receive antennas at the terminal side. In addition, wireless communication system 100 may be configured with four transmit or receive antennas, and the particular antenna arrangement is reflected in LTE specifications. Different gains are achieved, according to the MIMO transmission mode that is used.

Spatial multiplexing enables transmission of different streams of data simultaneously on the same resource block(s) by exploiting the spatial dimension of the radio channel. These data streams can belong to one single user (single user MIMO/SU-MIMO) or to different users (multi user MIMO/ MU-MIMO). While SU-MIMO increases the data rate of one user, MU-MIMO provides an increase in overall capacity. Spatial multiplexing is possible if allowed by the mobile radio channel.

In wireless communication system (WCS) 100/BS 106, transmission mode selection (TMS) utility 120 receives one or more feedback reports from a wireless device (e.g., MS 102) indicating the wireless device's "choice" for physical downlink shared channel (PDSCH) service via a particular transmission mode (TxMode) and a specific rank (i.e., via a particular pairing of transmission mode and rank). For example, given that the current transmission mode is 4 (i.e., Closed Loop Spatial Multiplexing (CLSM)), the mobile device may report the best Rank2-precoder (i.e., the wireless/ mobile device requests Rank2) and the Channel Quality Indicators (CQIs) corresponding to the 2 layers of the Rank2 precoder. The LTE system allows the wireless device to provide feedback (reports) consisting of channel quality indicator (CQI) reports, Precoder Matrix Index (PMI) reports and Rank Indicator (RI) reports. In CL-MIMO, the mobile device reports (a) the best Rank (i.e., either 1 or 2) via RI, (b) the best precoder at that rank via the PMI, and (c) the estimated max supportable data-rate (i.e., based on the CQI) given that rank and precoder to the eNodeB. The eNodeB may then schedule data for the mobile on the physical downlink shared channel (PDSCH) using the reported channel information on the requested Rank, Precoder and CQIs.

TMS utility 120/enodeB 106 receives an indication of a choice of the best rank via rank indicator 132 as well as a corresponding precoder (i.e. a candidate precoder) and signal-to-noise+interference power ratio (C/I) in Precoding-Matrix-Indicator (PMI) 130 and Channel Quality Indicator (CQI) 128 respectively. TMS utility 120 may select an Open Loop Spatial Multiplexing (OLSM) transmission mode when channel conditions do not enable a particular CLSM transmission mode and rank pairing to achieve effective optimal/ effective performance. OLSM consists of sending one (1) or two (2) concurrent data streams to the mobile. OLSM is similar to the closed loop transmission mode, but unlike CLSM, OLSM has no PMI feedback. OLSM feedback is limited to a CQI and a Rank-Indicator (RI). In LTE, Rank1 OLSM (i.e., a Rank1 OLSM pairing) implements Transmit Diversity via Space-Time-Block-Codes or Space-Frequency-Block-Codes. Rank2 OLSM (i.e., a Rank2 OLSM pairing) is implemented as Large-Delay-Cyclic-Delay-Diversity (LD-CDD). However, since LD-CDD does not involve a PMI feedback, LD-CDD is more resilient in high speed mobile environments than is Rank2 CLSM. According to LTE, Mode3 consists of Rank1 and Rank2 OLSM. Mode4 consists of Rank1 and Rank2 CLSM as well as Transmit Diversity (Rank1 OLSM). Switching the mobile from Rank2 CLSM to Transmit Diversity does not require any radio resource control (RRC) involvement that may cause procedural overheads, since per the LTE standard, Transmit Diversity is part of both Transmission Mode 4 and Mode 3.

In wireless communication system 100, TMS utility 120 utilizes device feedback information and HARQ error information that are already existing/available in order to determine the best transmission mode and rank pair. In particular, TMS utility 120 utilizes feedback reports received from the wireless device as well as HARQ error history to determine an estimate of the throughput corresponding to the first pairing of transmission mode (e.g., CLSM) and rank (e.g., rank2) requested/indicated by the wireless device (e.g., MS 102). In addition, TMS utility 120 obtains estimates of HARQ error adjusted throughput corresponding to other distinct pairings of transmission mode and rank to compare with the throughput estimate corresponding to the request. TMS utility 120 compares HARQ error adjusted throughputs corresponding to the first pairing and the other distinct pairings, respectively, in order to schedule transmission service based on the highest HARQ Error-Adjusted-Throughput. Furthermore, even after selecting a particular transmission mode and rank, TMS utility 120 periodically evaluates the performance of other transmission modes and rank, and switches to the (Transmission Mode, Rank) pair that TMS utility 120 estimates is able to support the highest data rate to the mobile.

Figure 3:
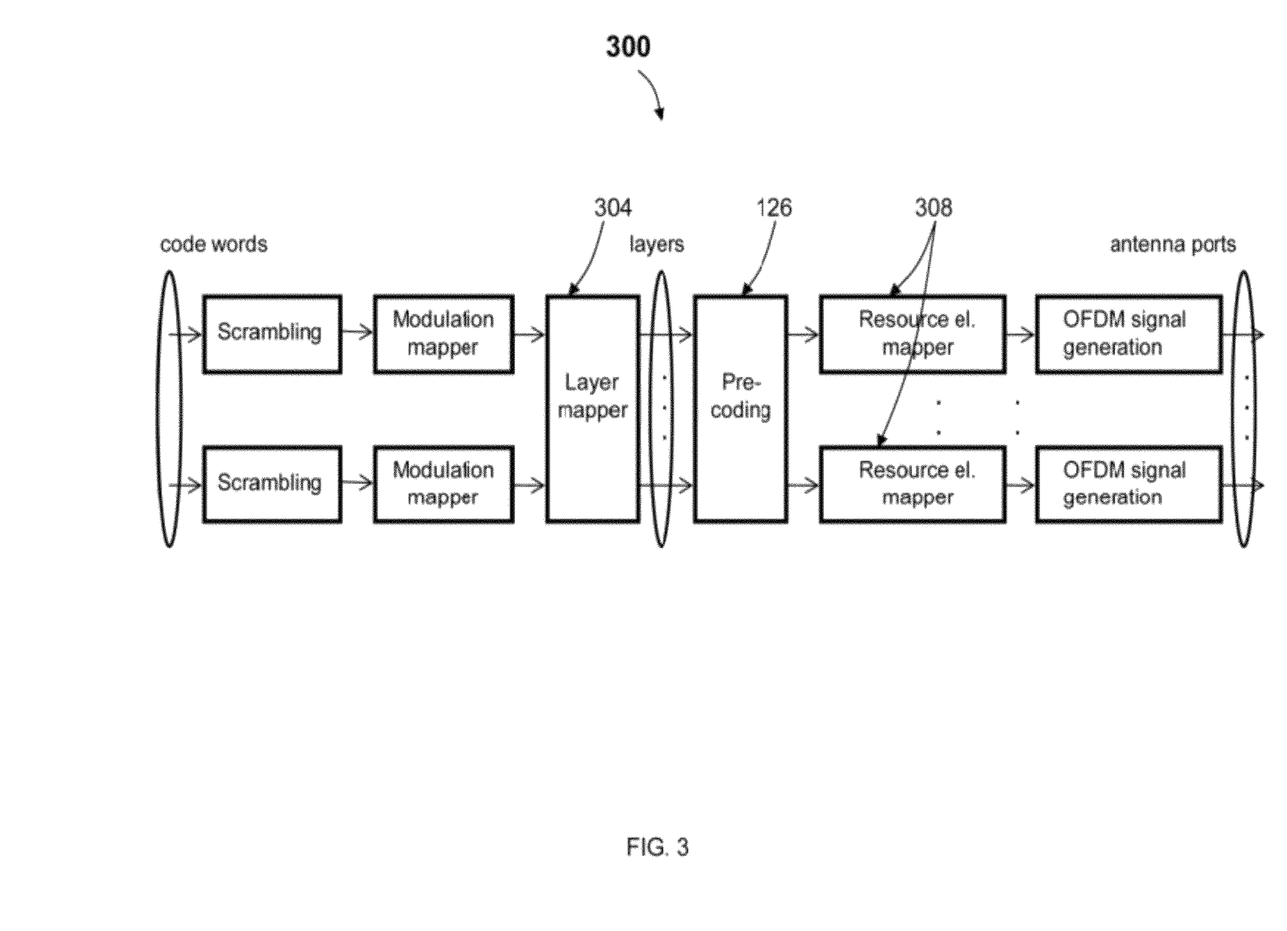
FIG. 3 is a block diagram illustrating Long Term Evolution (LTE) downlink baseband signal generation at the BS/eNodeB, including the functional components relevant for Multiple-Input Multiple-Output (MIMO) transmission (i.e., layer mapping and precoding), according to one embodiment.

FIG. 3 is a block diagram illustrating LTE downlink baseband signal generation at the BS/eNodeB, including the functional components/processes relevant for MIMO transmission (i.e., layer mapping and precoding), according to one embodiment. ENodeB downlink system 300 comprises several downlink signal generation blocks of which layer mapper 304, precoder block 126 and resource element mapper block(s) 308 are illustrated.

In LTE spatial multiplexing, up to two code words can be mapped onto different spatial layers via layer mapper 304. One code word represents an output from the channel coder (not explicitly shown). The number of spatial layers available for transmission is equal to the rank of a corresponding channel matrix. TMS utility 120 utilizes precoding on the transmitter side to support spatial multiplexing. In particular, TMS utility 120/BS/enodeB 106 multiplies the signal with a specific precoding matrix at precoding block 126 before transmission. TMS utility 120 selects the optimum precoding matrix (i.e., the matrix which provides maximum capacity) from a predefined "codebook" which is known at BS/eNodeB 106 and at MS 102.

Figure 4:
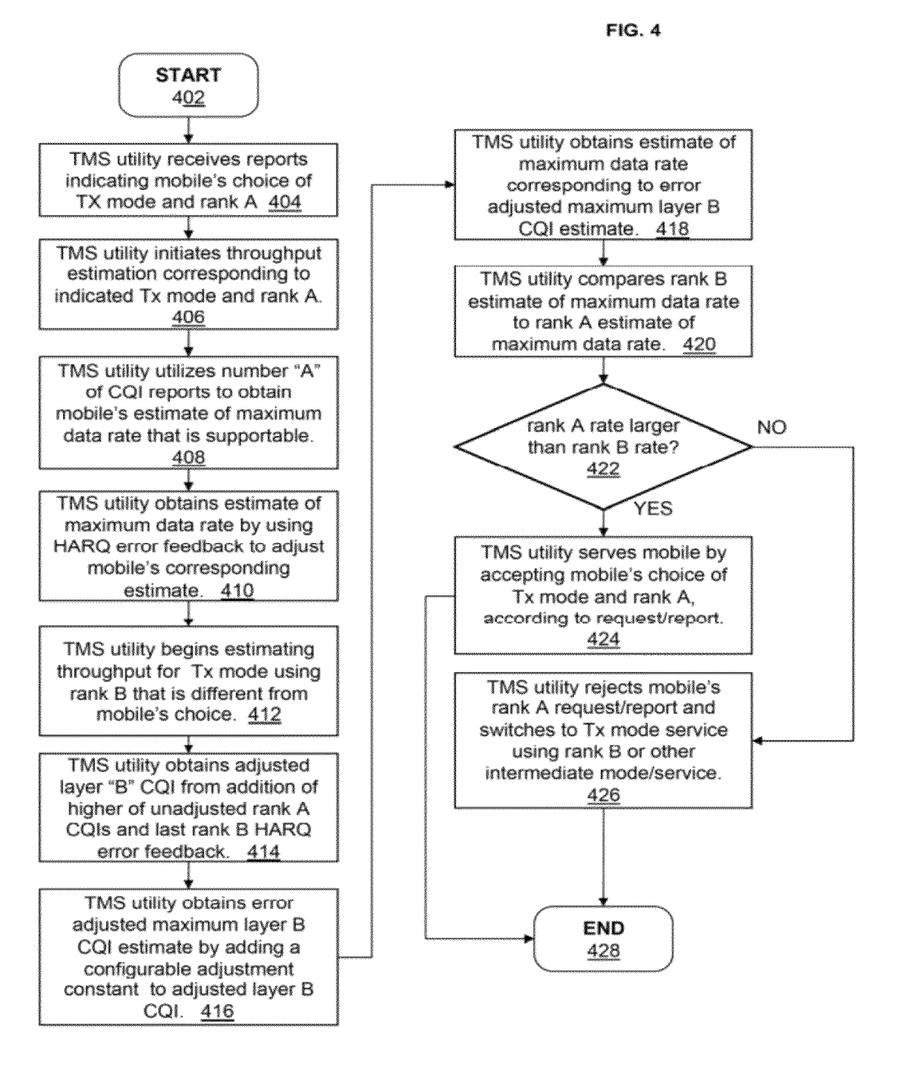
FIG. 4 is a flow chart which illustrates the process of selecting a transmission mode and rank by using available Hybrid Automatic Repeat Request (HARQ) feedback error history, according to one embodiment.

FIG. 4 is a flow chart which illustrates the process of selecting a transmission mode and rank by using available HARQ feedback error history, according to one embodiment. Although the method illustrated in FIG. 4 may be described with reference to components shown in FIGS. 1-2, it should be understood that this is merely for convenience and alternative components and/or configurations thereof can be employed when implementing the method. Key portions of the method may be completed by TMS utility 120 executing within eNodeB 106 (FIGS. 1-2) and controlling specific operations of/on enodeB/BS 106, and the method is thus described from the perspective of either/both TMS utility 120 and eNodeB 106.

The process begins at initiator block 402 and proceeds to block 404, at which, TMS utility 120 receives one or more feedback reports and, in particular, a CQI report, a PMI report and an RI report from a mobile/wireless (subscriber) device (e.g., UE/MS 102). Based on receipt of these feedback reports, TMS utility 120/eNodeB 106 receives indication of the mobile/wireless device's choice of transmission mode T and a particular rank "A" (e.g., A=2). TMS utility 120 initiates throughput estimation corresponding to the indicated Tx mode and particular rank, as shown at block 406. At block 408, TMS utility 120 utilizes a number (corresponding to the particular rank indicated by the mobile) of CQI reports to obtain the mobile's estimate of maximum data rate that is supportable via the downlink transmission. At block 410, TMS utility 120 utility obtains an estimate of the maximum data rate by using HARQ error feedback to adjust the mobile's estimate. TMS utility 120 begins estimating throughput values for distinct pairings of transmission mode and rank including a pairing with a same transmission mode T with a rank "B" (e.g., B=1) that is different from mobile's choice of rank, as shown at block 412. The best rank "B" precoder and the corresponding CQI values are not known to eNodeB 106, since the mobile has reported a rank "A" precoder and corresponding CQI values.

In one embodiment, TMS utility 120 uses one or more CQI values from a pairing of a specific transmission mode and higher rank (i.e., the higher Rank pairing) to provide one or more adjusted CQI values for a (different) pairing of the (same) specific transmission mode and lower rank (i.e., the lower Rank pairing). Obtaining the adjusted CQI value(s) from one or more CQI values from the higher Rank pairing is feasible if the CQI value(s) from the higher Rank pairing is appropriately adjusted to compensate for interference from additional layers that are present for the higher Rank pairing but absent for the lower Rank pairing. If, for example, Rank A represents Rank 2 and Rank B represents Rank 1, TMS utility 120 obtains an adjusted layer 1 CQI value (corresponding to a lower/Rank 1 pairing) by compensating for the interference from the second Layer of Rank 2. A Rank1 transmission has only one (1) layer and does not have interference from a second layer. As a result, Rank1 CQI would be higher than the maximum Rank2 CQI. Based on simulations that demonstrate that the Rank1 CQI is on average about 5 dB higher than the Rank 2 CQI for both CLSM and OLSM, TMS utility 120 utilizes a preset/configurable value to compensate for interference. However it can be shown that the performance of the TMS utility does not depend on the specific value of the configurable constant, specifically if the preset value is different from the actual difference in the Rank1 CQI and the maximum Rank2 CQI.

Returning to FIG. 4, at block 414, to obtain an adjusted layer "B" CQI, TMS utility 120 adds (a) the higher (one) of the unadjusted rank "A" CQIs and (b) the rank "B" HARQ error feedback stored at the eNodeB. At block 416, to obtain an error adjusted layer "B" CQI (i.e., an error adjusted throughput) estimate, TMS utility 120 adds a configurable adjustment constant to the adjusted layer B CQI. TMS utility 120 obtains the configurable adjustment constant from an average of an amount by which a CQI value of rank "B" is larger than a maximum CQI value for rank "A", according to experimentation and previous measurements. TMS utility 120 evaluates an estimate of the data rate corresponding to the error adjusted layer B CQI estimate, as shown at block 418. At block 420, TMS utility 120 compares the Tx mode T and rank B (pairing) estimate of data rate (as well as estimates corresponding to other distinct pairings) to the Tx mode T and rank A estimate of data rate.

TMS utility 120 determines whether the estimate of data rate corresponding to rank "A" is larger than the estimate of data rate of rank B, as shown at decision block 422. If at decision block 422 TMS utility 120 determines that the estimate of data rate corresponding to rank A is larger than the estimate of data rate of TxMode T and rank B (and other estimates corresponding to the other distinct pairings), TMS utility 120 serves (i.e., transmits data to) the mobile by accepting/selecting the mobile's choice/indication of a pairing of Tx mode T and rank A, according to the request/report(s), as shown at block 424. However, if at decision block 422, TMS utility 120 determines that the estimate of data rate corresponding to rank A is smaller than the estimate of data rate of rank B, TMS utility 120 rejects the mobile's indication of Tx mode T and rank "A" and switches to service via the same Transmission mode (i.e., TxMode T) and rank B or via another/Transmission mode and rank (e.g., Transmission Mode 3, Rank1 or Rank2), as shown at block 426. The process ends at block 428.

In one embodiment, following a rejection of a particular transmission mode and/or rank, TMS utility 120/eNodeB 106 periodically checks whether or not conditions have sufficiently improved to provide a re-evaluation/re-consideration of the particular transmission mode and/or rank that was previously rejected. Re-evaluation/re-consideration of the particular transmission mode and/or rank allows TMS utility 120 to avoid an overly conservative TxMode and Rank selection. The re-evaluation/re-consideration may include or may accompany an adjustment procedure that factors improvement in transmission conditions to modify HARQ error adjustments.

To enable potential feedback adjustments based on a re-evaluation, if TMS utility 120 rejects the transmission mode (i.e., TxMode T) and rank (i.e., Rank A) that the wireless device requests, TMS utility 120 initiates a counter 136 (FIG. 1) (i.e., set counter value to 1) (block 506/FIG. 5) if the current rejection (i.e., of the transmission mode and rank) of the user's current request was accepted when last requested by the wireless device. In addition, TMS utility 120 may initiate the counter if the rejection of the request (a) occurs at the first time that the request is presented (in a particular time period) and/or (b) occurs for a request for which there is not yet any stored HARQ feedback history. If the same/identical request (e.g., for service via transmission mode T and Rank A pairing) by the wireless device is currently rejected and was also rejected when last requested, TMS utility 120 increments the counter by 1. Thus, the counter is incremented if a current rejection continues or forms a consecutive pattern of similar rejections, and the counter is reset to 0 or 1 if a previous rejection pattern is currently broken.

If the counter value reaches a pre-determined threshold value, TMS utility 120 modifies the HARQ adjustment values corresponding to the previously rejected TxMode T and Rank A (e.g., by dividing the HARQ adjustments by 2). In other words, TMS utility 120 determines whether the counter reaches a configurable threshold value (e.g., 100 successive TxMode T and Rank A override decisions). If the counter reaches the configurable threshold value, then TMS utility 120/eNodeB 106 modifies the TxMode T and Rank "A" HARQ adjustments. For example, TMS utility 120 divides these HARQ adjustments by 2 (or by some other preconfigured integer), and uses these updated HARQ values to re-calculate the estimated data-rate for TxMode T and Rank "A".

The HARQ modification for the given (TxMode, Rank) pair is needed for the following reason: If TMS utility 120/eNodeB 106 has been continuously rejecting the mobile's choice of TxMode T and Rank A, then the HARQ adjustment values for this (TxMode T, Rank A) pair are not normally/generally updated at eNodeB 106. The fact that the particular HARQ adjustment values are not generally adjusted during transmission service via a different/chosen pair results from the fact that eNodeB 106 serves data to the mobile in the different/chosen TxMode and Rank pair, and the HARQ adjustments (based on ACK/NAK from the mobile) corresponds to that chosen TxMode and Rank pair. As a result, the HARQ adjustment values of the particular (TxMode T, Rank A) pair that are/were reported by the mobile are "stuck at some earlier point in the history". However, channel conditions may have changed at the mobile/wireless device to favor the selection of TxMode T and Rank A, but the historical HARQ error adjustments maintained at the eNodeB for this (TxMode T, Rank A) pair would still have a negative bias. TMS utility 120 provides a procedure for periodically reducing/modifying the HARQ adjustments for the overruled (TxMode T, Rank A) pair that allows TMS utility 120/eNodeB 106 to reduce the negative historical HARQ bias when TMS utility 120 periodically checks the estimated datarate for this transmission mode and rank pair.

Figure 5:
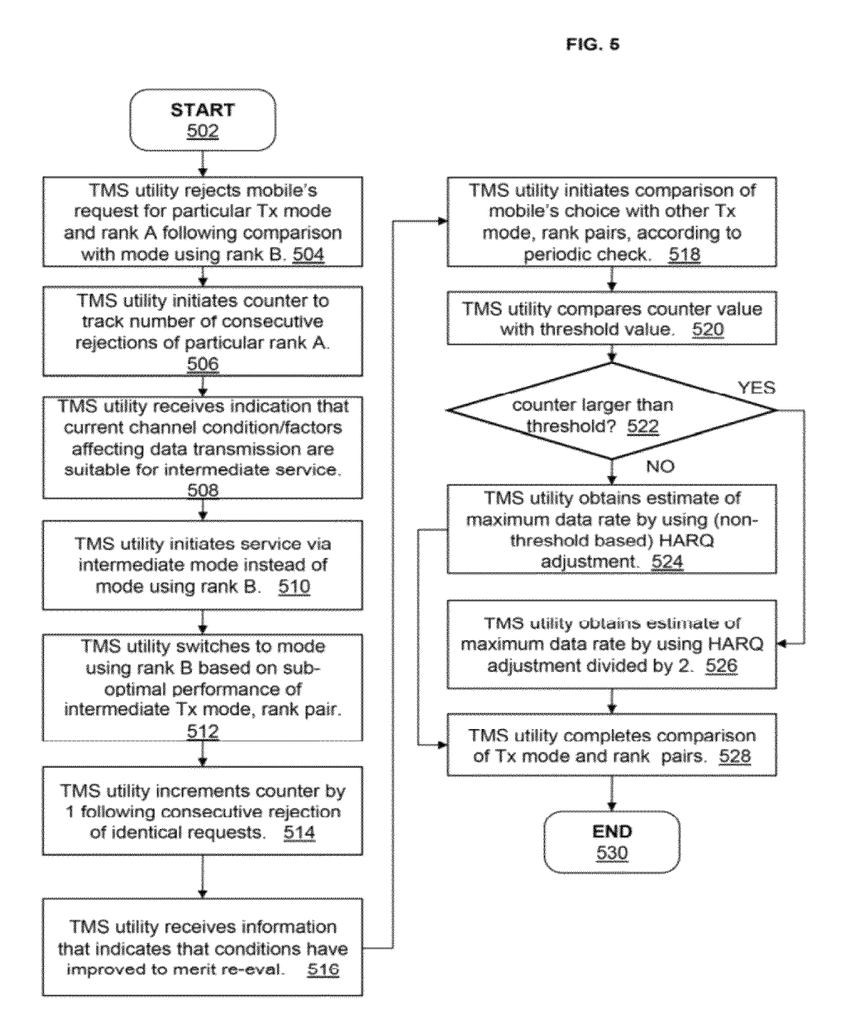
FIG. 5 is a flow chart which illustrates the process of periodically evaluating transmission conditions and using a threshold value to provide a particular HARQ error adjustment, according to one embodiment.

FIG. 5 is a flow chart which illustrates the process of periodically evaluating transmission conditions and using a threshold value to provide a particular HARQ error adjustment, according to one embodiment. The process begins at initiator block 502 and proceeds to block 504, at which, TMS utility 120 rejects the mobile's request for a particular Tx mode and rank "A" following comparison with Tx mode and rank B. TMS utility 120 initiates a counter to track the number of consecutive rejections of a particular pairing of Tx mode and rank A, as shown at block 506. At block 508, TMS utility 120 receives indication that the current channel conditions and other factors affecting data transmission are suitable for transmission service via an intermediate service pairing.

In one embodiment, the TMS utility 120 (eNodeB) performs the selection of the (TxMode, Rank) pair by testing the performance of each (TxMode, Rank) pair, using the 2-way cascading fallback, and ultimately selecting the pair that gives the best data-rate. With this methodology, each of the (TxMode, Rank) pairs are tested and the best pair is selected based on the measured error performance, rather than by using a heuristic map to select an "appropriate" TxMode and Rank from a given estimate of the speed and correlation. Thus, given a Transmission Mode T and Rank A reported by the mobile, TMS utility 120 ultimately performs one or more of the following: (a) the utility honors the mobile's request and selects Transmission Mode T and Rank A for serving data to the mobile; (b) the utility selects a pairing comprising the same Transmission Mode T but some other Rank B (that is different from A) for serving the mobile; (c) the utility selects a different Transmission Mode T1 and same rank A; and (d) the utility selects a different Transmission Mode T1 and different rank B. The selection is based on the eNodeB's estimate of the Transmission Mode and Rank pair that is likely to provide the highest data-rate to the mobile, given the eNodeB's estimate of the channel conditions and the mobile's HARQ history. The HARQ history is maintained for each Transmission Mode and Rank pair. In one embodiment, TMS utility 120 provides for a cascading fallback from the most/very aggressive and potentially highest data rate mode (e.g., Transmission Mode 4, Rank 2) to the most/very conservative and potentially lowest data rate mode (e.g., Transmission Mode 3, Rank 1 which is also called Transmit Diversity) based on the measured performance of these modes.

In another embodiment, TMS utility 120 executes a switch from service via a first pairing to service via a second pairing in several steps. TMS utility 120 may first switch to an intermediate service via a third pairing. A change to the intermediate service may provide a more moderate/gradual change (in aggressiveness or conservativeness) than a change to the second service. Secondly, TMS utility 120 may switch to service via the second pairing if the intermediate service does not achieve satisfactory performance. Illustrating the preceding (description of the action that TMS utility 120 performs based on a set of transmission mode and rank pairing options) is the following example described via enumerated steps: (1) The mobile reports/requests Transmission Mode 4 and Rank2, but TMS utility 120/eNodeB 106 determines that the performance at the mobile's requested/reported mode to be suboptimal based on the HARQ error history at this reported/requested mode; (2) As a result, TMS utility 120/eNodeB 106 switches the mobile to another mode (e.g., Transmission Mode3, Rank2), that potentially provides the next highest data rate. This switch may solve a current performance issue if degraded performance at the previous mode is due to higher mobile speed; (3) If TMS utility 120 determines that performance remains suboptimal, then TMS utility 120/eNodeB 106 is able to switch the mobile to another mode (e.g., Transmission Mode4, Rank1) that potentially provides the next highest data rate (i.e., lower and more conservative than the previous 2 modes). This mode selection may solve the problem if the performance issue at the previous modes was due to a high correlation (low rank) channel; and (4) If all these intermediate mode and rank switches fail, then TMS utility 120/eNodeB 106 is able switch the mobile to Transmission Mode 3 and Rank1, which pairing of transmission mode and rank is known as Transmit Diversity. In one embodiment, Transmit Diversity is the most conservative transmission mode. In addition, Transmit Diversity is the most robust and has the best error performance.

Referring again to the flow chart of FIG. 5, at block 510, TMS utility 120 switches service for UE/MS 102 by selecting an intermediate pairing comprising a different/second transmission mode with either same rank A or some other rank. In one embodiment, when a preconfigured maximum value for a level of change in performance aggressiveness for the wireless device is less than a potential level of change (in the level of aggressiveness) from a previously selected pairing to the current best (calculated) pairing, TMS utility 120 schedules transmission service via an intermediate pairing, according to the preconfigured maximum value. In one embodiment, TMS utility 120 determines the throughput performance level via the second/different transmission mode and rank and TMS utility 120 switches from the second/intermediate mode to a third transmission mode and rank only if the performance level via the second transmission and rank is unsatisfactory/sub-optimal.

TMS utility 120 switches to a third pairing of Transmission Mode T and rank B (instead of the mobile's (repeated) request for Transmission Mode T and rank A) based on sub-optimal performance of the second pairing of Transmission mode T1 and rank B, as shown at block 512. At block 514, TMS utility 120 increments the counter by one (1) to begin/continue tracking a number of consecutive rejections of the mobile's request (i.e., the TxMode T and Rank A pair). TMS utility 120 determines that conditions have improved to merit re-evaluation of other/specific transmission modes and ranks based on information (e.g., a trend of improvement in CQI reports or other feedback) received that indicates an improvement in channel conditions, as shown at block 516.

In one embodiment, TMS utility 120 triggers a period check (by switching to the TxMode and Rank pairing under evaluation) following receipt of indications of improved channel conditions. In another embodiment, TMS utility 120 initiates the periodic check by evaluating higher quality feedback and/or by evaluating other feedback that is adjusted to minimize information bias. In another embodiment, TMS utility 120 performs the switch to complete/perform a practical evaluation if the type and quality of information required for effective/efficient evaluation is unavailable and/or if the type of information required is provided only by a particular transmission mode and/or Rank. According to the periodic check, TMS utility 120 allows periodic switching back from a lower/conservative Transmission mode and rank to a higher/aggressive Transmission Mode and rank to determine if conditions have improved at the particular higher Transmission Mode and rank. As an illustration, TMS utility 120/eNodeB 106 may have previously chosen to serve UE 102 on Transmission Mode 3, Rank1. However, TMS utility 120 also periodically checks the performance of the other Transmission Modes and Ranks (e.g., [Transmission Mode 3, Rank2], [Transmission Mode4, Rank1], [Transmission Mode4, Rank2]) that can potentially provide higher data rates. In order to perform the periodic check, TMS utility 120 may switch to any of these other Transmission Modes and Rank.

Returning to FIG. 5, at block 518, TMS utility 120 initiates a comparison of the mobile's choice (i.e., TxMode T, Rank A pair) with other transmission mode and rank pairs including Tx mode and rank B pair, according to the periodic check. TMS utility 120 compares the counter value (that tracks consecutive rejections of the TxMode T and Rank A pair) with the threshold value, as shown at block 520. At decision block 522, TMS utility 120 determines whether the counter value is larger than the threshold value. If at decision block 522 TMS utility 120 determines that the counter value is not larger than the threshold value, TMS utility 120 obtains an estimate of the actual maximum data rate corresponding to TxMode T and rank A by using a (non-threshold based) HARQ adjustment, as shown at block 524. However, if at decision block 522 TMS utility 120 determines that the counter value is larger than the threshold value, TMS utility 120 obtains the estimate of the actual maximum data rate by using a HARQ adjustment divided by 2 (or other integer/value), as shown at block 526. TMS utility 120 re-initiates/continues the comparison of Tx mode and rank pairs, as shown at block 528. The process ends at block 530.

Simulation data indicates that incorporating the functionality of TMS utility 120 into the TxMode and Rank selection process of an eNodeB improves the downlink throughput by 110% in some cases and by 25-50% on an average compared to systems which do not employ TMS utility 120. In addition, an eNodeB equipped with TMS utility 120 is able to match the theoretical "best case" throughput over a wide range of signal quality and channel models. Furthermore, TMS utility 120 shrinks the C/I range over which the measured throughput differs from the "ideal" value.

TMS utility 120 provides a solution that performs well even in cases where other more complex methods that select the best Transmission Mode and Rank based on explicit measurements of the mobile speed and channel correlation fail. For example, the actual delivered performance for downlink CL-MIMO may also depend on the radio frequency (RF) performance of the mobile. While all mobiles are expected to meet the minimum performance criteria, some mobiles may be better at handling high-spectrally-efficient schemes than others. In other words, for the same relative speed (Doppler) and channel correlation, the actual downlink performance may have mobile specific variations. Algorithms that explicitly consider only the Doppler and channel correlation factors may end up selecting downlink transmission modes for all mobiles in the same way. However, by providing a solution based on the Error-Adjusted-Throughput, TMS utility 120 identifies higher/lower errors in the selected transmission modes and selects a mode that best suits a mobile, given the HARQ error history. Thus, TMS utility 120 provides a low complexity low MIPS (i.e., millions of instructions per second) solution that reuses HARQ information that already exists at the eNodeB.

In the flow chart above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

The illustrated and described embodiments provide, in an eNodeB, a mechanism and system for selecting a downlink transmission mode in a Long Term Evolution (LTE) configured wireless communication system. The Transmission Mode Selection (TMS) utility/logic receives from a wireless device a request for downlink physical downlink shared channel (PDSCH) service using a particular transmission mode and specific rank. The TMS utility determines an estimate of the throughput corresponding to the request. In addition, the TMS utility obtains estimates of HARQ error adjusted throughput corresponding to other distinct pairings of transmission mode and rank to compare with the throughput estimate corresponding to the request. The TMS utility utilizes device feedback information and HARQ error information that are already existing/available in order to determine the best transmission mode and rank pair, according to the best Error-Adjusted-Throughput. Furthermore, even after selecting a particular transmission mode and rank, TMS utility 120 periodically evaluates the performance of other transmission modes and rank, and switches to the (Transmission Mode, Rank) pair that TMS utility 120 estimates is able to support the highest data rate to the mobile.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional base station/eNodeB with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless communication system having an Evolved Universal Terrestrial Radio Access Network Node B (eNodeB), a method for allocating communication resources to wireless devices, said method comprising:
    receiving a request from a wireless device for downlink physical shared channel (PDSCH) downlink transmission via a particular transmission mode and a specific rank that represents a first pairing;
    retrieving one or more of: (a) historical Hybrid Automatic Repeat Request (HARQ) feedback information corresponding to said particular transmission mode and rank; (b) Channel Quality Indicators (CQIs) corresponding to one or more layers of the precoder corresponding to the specific rank requested; (c) a Precoder Matrix Index (PMI) report that provides a best precoder corresponding to said particular transmission mode and said specific rank; and (d) a rank indicator (RI) report;
    obtaining an estimation of a first HARQ error adjusted throughput associated with said particular transmission mode and said specific rank requested by said wireless device;
    providing estimates of HARQ error adjusted throughput corresponding to other distinct pairings of transmission mode and rank;
    comparing said estimation of said first HARQ error adjusted throughput with said estimates of HARQ error adjusted throughput;
    in response to said comparing, selecting a best pairing of transmission mode and rank with a higher HARQ error adjusted throughput for transmission service for said wireless device; and
    in response to the selection, periodically switching from the selected pairing of transmission mode and rank to other pairings of other transmission modes and rank to check if conditions have adequately improved to warrant transmission at a different pairing of transmission mode and rank.

2. The method of claim 1, wherein said obtaining further comprises:
    evaluating one or more adjusted CQI values from a modification of the one or more CQI values by said historical HARQ feedback information;
    determining one or more data rates corresponding to the one or more adjusted CQI values; and
    determining a first estimate of maximum data rate corresponding to said first pairing that is supportable via downlink transmission based on one of: (a) the one data rate corresponding to a single CQI value; and (b) addition of multiple data rates corresponding to a plurality of CQI values.

3. The method of claim 1, wherein said providing further comprises:
when a first rank of the first pairing is higher than a second rank of another distinct pairing:
identifying a larger value among a plurality of reported CQI values corresponding to said specific rank of said first pairing;
calculating a HARQ error adjusted CQI for the distinct pairing with the second rank, by adding a corresponding, stored HARQ error feedback value to said larger value among a plurality of reported CQI values corresponding to said first rank of said first particular pairing; and
calculating an estimate of a maximum CQI for said second rank by adding a configurable constant to said HARQ error adjusted CQI for said distinct pairing having the second rank.

4. The method of claim 1, wherein said providing further comprises:
when said second rank is not lower than said first rank:
deriving estimated adjusted CQI values for the distinct pairing from reported CQI values for said first pairing;
calculating HARQ error adjusted CQI values for the distinct pairing with the second rank, by adding a corresponding, stored HARQ error feedback value to estimated adjusted CQI values;
calculating estimates of maximum CQI values for said second rank by subtracting a configurable constant from said HARQ error adjusted CQI for said distinct pairing having the second rank;
wherein said configurable constant is based on experimentation and previous measurements; and
evaluating a second estimate of maximum data rate corresponding to said estimate of said maximum CQI for said second rank.

5. The method of claim 1, further comprising:
in response to a first rejection of said first pairing of the particular transmission mode and the specific rank that is requested by said wireless device, initializing a counter to track a number of consecutive rejections of said first pairing when a previously requested first pairing was not rejected;
performing a periodic check of other pairings of transmission modes and rank
triggering a switch to the transmission mode and rank that has the best estimated HARQ error adjusted throughput in response to said periodic check; and
selecting service via said best pairing from among distinct pairings corresponding to transmission modes and rank pairings available for use at said wireless device.

6. The method of claim 5, further comprising:
when a preconfigured maximum value for a level of change in performance aggressiveness for said wireless device is less than a potential level of change from a previously selected pairing to said best pairing, scheduling transmission service via an intermediate pairing, according to said preconfigured maximum value;
determining a throughput performance level via the intermediate pairing; and
in response to a determination that said throughput performance level via the intermediate mode is sub-optimal, switching service to said best pairing of transmission mode and rank.

7. The method of claim 5, further comprising:
in response to a second rejection of first pairing, incrementing said counter by 1 if said first pairing was also rejected when last requested;
following said rejection of said first pairing, performing a periodic check to determine whether conditions are adequately improved to merit re-evaluation with potential threshold based HARQ adjustment;
initiating, according to said periodic check, comparisons of one or more of: (a) said first pairing and said best pairing; and (b) other distinct pairings and said best pairing;
determining whether a value of said counter is larger than the threshold value; and
in response to a determination that said value of said counter is not larger than the threshold value, obtaining a first estimate of an actual data rate corresponding to said first pairing by using a HARQ error adjustment directly from HARQ error feedback.

8. The method of claim 7, further comprising:
in response to a determination that said value of said counter is larger than the threshold value, obtaining a second estimate of the maximum data rate corresponding to said first pairing by using a HARQ error adjustment divided by a preset value; and
comparing said first pairing and the other distinct pairings, by using said second estimate of said maximum data rate corresponding to said first particular pairing, when said counter value is larger than the threshold value.

9. The method of claim 1, further comprising:
periodically switching downlink transmission service from a second pairing with a lower rank to said first pairing with a higher rank to determine if conditions are adequately improved to provide a practical evaluation of said first particular pairing.

10. A base station comprising:
a processor;
a memory having stored therein a scheduler;
a utility which when executed by the processor, provides the functions of:
receiving a request from a wireless device for downlink physical shared channel (PDSCH) downlink transmission via a particular transmission mode and a specific rank that represents a first pairing;
retrieving one or more of: (a) historical Hybrid Automatic Repeat Request (HARQ) feedback information corresponding to said particular transmission mode and rank; (b) Channel Quality Indicators (CQIs) corresponding to one or more layers of the precoder corresponding to the specific rank requested; (c) a Precoder Matrix Index (PMI) report that provides a best precoder corresponding to said particular transmission mode and said specific rank; and (d) a rank indicator (RI) report;
obtaining an estimation of a first HARQ error adjusted throughput associated with said particular transmission mode and said specific rank requested by said wireless device;
providing estimates of HARQ error adjusted throughput corresponding to other distinct pairings of transmission mode and rank;
comparing said estimation of said first HARQ error adjusted throughput with said estimates of HARQ error adjusted throughput;
in response to said comparing, selecting a best pairing of transmission mode and rank with a higher HARQ error adjusted throughput for transmission service for said wireless device; and
in response to the selection, periodically switching from the selected pairing of transmission mode and rank to other pairings of other transmission modes and rank to check if conditions have adequately improved to warrant transmission at a different pairing of transmission mode and rank.

11. The base station of claim 10, wherein said obtaining functions further comprises:
 evaluating one or more adjusted CQI values from a modification of the one or more CQI values by said historical HARQ feedback information;
 determining one or more data rates corresponding to the one or more adjusted CQI values; and
 determining a first estimate of maximum data rate corresponding to said first pairing that is supportable via downlink transmission based on one of: (a) the one data rate corresponding to a single CQI value; and (b) addition of multiple data rates corresponding to a plurality of CQI values.

12. The base station of claim 10, wherein said providing functions further comprises:
 when a first rank of the first pairing is higher than a second rank of another distinct pairing:
  identifying a larger value among a plurality of reported CQI values corresponding to said specific rank of said first pairing;
  calculating a HARQ error adjusted CQI for the distinct pairing with the second rank, by adding a corresponding, stored HARQ error feedback value to said larger value among a plurality of reported CQI values corresponding to said first rank of said first particular pairing; and
  calculating an estimate of a maximum CQI for said second rank by adding a configurable constant to said HARQ error adjusted CQI for said distinct pairing having the second rank.

13. The base station of claim 10, wherein said providing functions further comprises:
 when said second rank is not lower than said first rank:
  deriving estimated adjusted CQI values for the distinct pairing from reported CQI values for said first pairing;
  calculating HARQ error adjusted CQI values for the distinct pairing with the second rank, by adding a corresponding, stored HARQ error feedback value to estimated adjusted CQI values;
  calculating estimates of maximum CQI values for said second rank by subtracting a configurable constant from said HARQ error adjusted CQI for said distinct pairing having the second rank;
  wherein said configurable constant is based on experimentation and previous measurements; and
  evaluating a second estimate of maximum data rate corresponding to said estimate of said maximum CQI for said second rank.

14. The base station of claim 10, wherein the processor execution of the utility performs the functions of:
 in response to a first rejection of said first pairing of the particular transmission mode and the specific rank that is requested by said wireless device, initializing a counter to track a number of consecutive rejections of said first pairing when a previously requested first pairing was not rejected;
 performing a periodic check of other pairings of transmission modes and rank
 triggering a switch to the transmission mode and rank that has the best estimated HARQ error adjusted throughput in response to said periodic check; and
 selecting service via said best pairing from among distinct pairings corresponding to transmission modes and rank pairings available for use at said wireless device.

15. The base station of claim 14, wherein the processor execution of the utility performs the functions of:
 when a preconfigured maximum value for a level of change in performance aggressiveness for said wireless device is less than a potential level of change from a previously selected pairing to said best pairing, scheduling transmission service via an intermediate pairing, according to said preconfigured maximum value;
 determining a throughput performance level via the intermediate pairing; and
 in response to a determination that said throughput performance level via the intermediate mode is sub-optimal, switching service to said best pairing of transmission mode and rank.

16. The base station of claim 14, wherein the processor execution of the utility performs the additional functions of:
 in response to a second rejection of first pairing, incrementing said counter by 1 if said first pairing was also rejected when last requested;
 following said rejection of said first pairing, performing a periodic check to determine whether conditions are adequately improved to merit re-evaluation with potential threshold based HARQ adjustment;
 initiating, according to said periodic check, comparisons of one or more of: (a) said first pairing and said best pairing; and (b) other distinct pairings and said best pairing;
 determining whether a value of said counter is larger than the threshold value; and
 in response to a determination that said value of said counter is not larger than the threshold value, obtaining a first estimate of an actual data rate corresponding to said first pairing by using a HARQ error adjustment directly from HARQ error feedback.

17. The base station of claim 10, wherein the processor execution of the utility performs the additional functions of:
 in response to a determination that said value of said counter is larger than the threshold value, obtaining a second estimate of the maximum data rate corresponding to said first pairing by using a HARQ error adjustment divided by a preset value; and
 comparing said first pairing and the other distinct pairings, by using said second estimate of said maximum data rate corresponding to said first particular pairing, when said counter value is larger than the threshold value.

18. The base station of claim 10, wherein the processor execution of the utility performs the additional functions of:
 periodically switching downlink transmission service from a second pairing with a lower rank to said first pairing with a higher rank to determine if conditions are adequately improved to provide a practical evaluation of said first particular pairing.

19. The base station of claim 10, wherein the base station is an Evolved Universal Terrestrial Radio Access Network Node B (eNodeB) within a Long Term Evolution (LTE)-based wireless communication system.

20. An Evolved Universal Terrestrial Radio Access Network Node B (eNodeB) utilized within a Long Term Evolution (LTE)-based wireless communication system, the eNodeB comprising:
 a processor;
 one or more wireless transmitter/receiver devices (transceivers) communicatively coupled to the processor and which enables communicating with one or more wireless communication devices;
 a memory having stored therein a scheduler;
 a utility which when executed by the processor, provides the functions of:

receiving a request from a wireless device for downlink physical shared channel (PDSCH) downlink transmission via a particular transmission mode and a specific rank that represents a first pairing;

retrieving one or more of: (a) historical Hybrid Automatic Repeat Request (HARQ) feedback information corresponding to said particular transmission mode and rank; (b) Channel Quality Indicators (CQIs) corresponding to one or more layers of the precoder corresponding to the specific rank requested; (c) a Precoder Matrix Index (PMI) report that provides a best precoder corresponding to said particular transmission mode and said specific rank; and (d) a rank indicator (RI) report;

obtaining an estimation of a first HARQ error adjusted throughput associated with said particular transmission mode and said specific rank requested by said wireless device;

providing estimates of HARQ error adjusted throughput corresponding to other distinct pairings of transmission mode and rank;

comparing said estimation of said first HARQ error adjusted throughput with said estimates of HARQ error adjusted throughput;

in response to said comparing, selecting a best pairing of transmission mode and rank with a higher HARQ error adjusted throughput for transmission service for said wireless device; and in response to the selection, periodically switching from the selected pairing of transmission mode and rank to other pairings of other transmission modes and rank to check if conditions have adequately improved to warrant transmission at a different pairing of transmission mode and rank.

* * * * *